April 20, 1948. E. H. ANDERSON 2,439,917
WATER SEAL FOR SHAFT-BEARINGS
Filed July 28, 1945
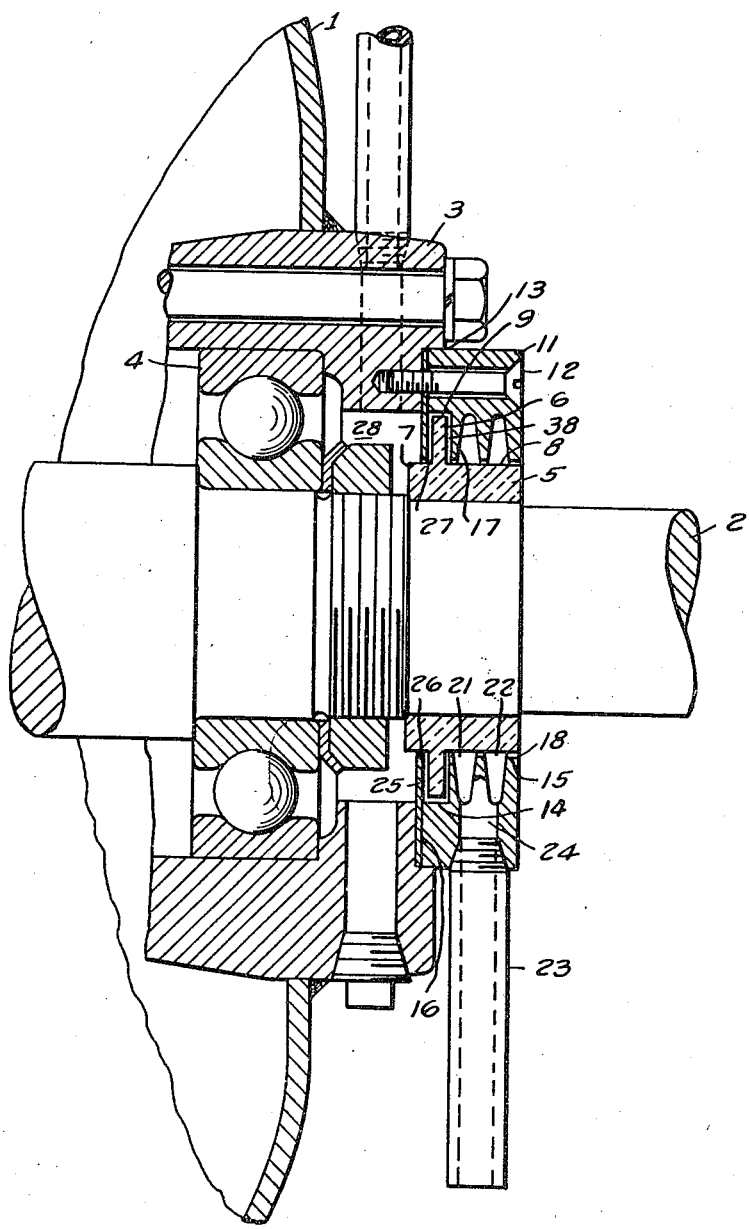
WITNESSES:
E. G. M?Closkey
Nin C. Roome
INVENTOR
Ephraim H. Anderson.
BY
O. B. Buchanan
ATTORNEY Patented Apr. 20, 1948

2,439,917

UNITED STATES PATENT OFFICE 2,439,917

WATER SEAL FOR SHAFT BEARINGS

Ephraim H. Anderson, Homewood, Pa., assignor to Westinghouse Electric Corporation, East Pittsburgh, Pa., a corporation of Pennsylvania Application July 28, 1945, Serial No. 607,643

3 Claims. (Cl. 286—5)

My invention relates to a mechanical water-seal for the shaft-extension end of a ball-bearing assembly, or other shaft-bearing, which will meet the most rigid tests in the specifications for water-tight motors. These specifications require a test by playing a stream of water from a hose with a one-inch nozzle, delivering not less than 65 gallons per minute, at a pressure equivalent to a head of 30 feet at the nozzle, from a distance of 10 feet, for a period of 1¼ minutes, from each of four directions. This test is to be made with the motor stopped and then repeated with the motor running, making a total of 10 minutes. These rigid water-tight specifications require that there shall be no leakage of water into the bearing-enclosure, under these conditions.

Heretofore these water-tight specifications have been met by a rotating water-seal which was carried by the shaft-extension, the rotating seal having a cylindrical extension which projected for a considerable axial distance, over an annular shoulder which was provided on the bracket-hub or bearing-housing. This water-seal of the prior art thus required a considerable axial distance, which made it difficult for the motor-manufacturer to meet the standard limiting dimensions for the overall length of the motors, as set by N. E. M. A.

The object of my invention is to provide an improved type of water-seal which will better meet the requirements of the above-stated problem.

An illustrative form of embodiment of my invention is shown in the accompanying drawing, the single figure of which is a longitudinal sectional view of the shaft-extension end of a motor embodying my invention.

The motor or other machine to which my invention is applied has a stationary bracket 1, and a rotatable shaft 2 which extends through said bracket. The bracket 1 has a bracket-hub 3, which carries a shaft-supporting bearing 4 which is illustrated as a ball-bearing.

My improved water-seal comprises a flinger 5 which is carried by the shaft 2, just outside of the bearing 4. The flinger 5 is in the form of a sleeve which has a radially outwardly extending flinger-flange 6 which is adjacent to, but spaced from, the end 7 of the flinger which is nearest the bearing, said sleeve and said flinger-flange having cylindrical outer peripheries 8 and 9, respectively.

The water-seal is completed by an annular cap 11 which is removably carried by the bracket-hub 3, being held in place by flat-head screws 12, and being sealed, at its attachment-points 13, with red lead or any good waterproof cement. The cap 11 is provided with a cylindrical groove 14 which extends back from the inner periphery 15 of the cap, at the bearing-end 16 of the cap. The cylindrical bore 14 of said groove is spaced from the cylindrical periphery 9 of the flinger-flange 6, while the radial wall 17 of the groove is spaced from the outer side of the flinger-flange 6. The inner periphery 15 of the cap 11 is a cylindrical bore having a close clearance 18 from the outer periphery of the flinger-sleeve 5, this clearance being preferably about .005 inch on the radius. The clearance between the outside periphery 9 of the flinger-flange 6 and the bore 14 of the groove in the cap 11 may be of the order of 1/64 inch on the radius.

To provide a water-seal, the cap 11 has one or more relatively wide grooves 21 and 22 which terminate in its inner periphery 15, the grooves 21 and 22 being cut back into the cap 11. The water-seal is completed by means of a drain-pipe 23 which is screwed into the lower side of the cap 11, and sealed water-tight thereto, the lower end of the pipe 23 being open. The upper end of the pipe 23 is in draining communication with the relatively wide grooves 21 and 22 of the cap 11, as indicated at 24.

My invention also preferably utilizes a lubricant-loss-inhibiting means, which is disposed between the bearing 4 and the flinger-flange 6, when the bearing 4 is in the form of a grease-lubricated ball-bearing, as illustrated. This lubricant-loss-inhibiting means preferably takes the form of an inwardly projecting hub-flange 25, which is illustrated as a disk 25 which is secured to the bracket-hub 3 and which has a cylindrical bore 26 which is closely spaced from the cylindrical periphery 8 of the flinger-sleeve 5. The outer side of the hub-flange or disk 25 is spaced from the inner side of the flinger-flange 6, to provide a cavity 27 which is normally at least partially filled with the same grease which fills the grease-chamber 28 of the bearing.

Any suitable materials of construction may be utilized for the various parts. In a preferred form of construction, I make the flinger 5 of brass or bronze, and the cap 11 of steel or malleable iron. I am not limited, however, to these particular materials.

In operation, the relatively wide water-sealing grooves 21 and 22 are not filled with grease, but are filled with air, the grease being partially confined by the disk 25, so that it does not encroach further outwardly from the bearing than the previously mentioned grease-pocket 27 between the disk 25 and the flinger-flange 6. Any water which enters the water-sealing grooves 21 and 22, through the annular clearance 18 between the flinger 5 and the cap 11, is drained off by the pipe 23, and the radially extending shape of the flinger-flange 6 prevents water from running along the flinger 5 into the grease-chamber 28 of the bearing. Tests have shown that the water does not penetrate further inwardly than the outer side 38 of the flinger-flange 6, at any time. At the same time, my improved water-seal requires less axial space, at the end of the motor, than any other previously known water-seal for meeting the previously indicated rigid specifications, thus making it easier for the motor-designer to keep within the prescribed limits for the overall axial length of the motor.

I claim as my invention:

1. An improved water-seal for a machine having a stationary bracket and a rotatable shaft extending through said bracket, said bracket having a bracket-hub, and a shaft-supporting bearing-housing carried by said bracket-hub, said improved water-seal comprising a flinger carried by the shaft just outside of said bearing-housing, said flinger comprising a sleeve having a radially outwardly extending flinger-flange adjacent to, but spaced from, its inner end, said sleeve and said flinger-flange having cylindrical outer peripheries, an annular cap removably carried by said bracket-hub, said cap having a cylindrical groove extending back from the inner periphery of the cap at the inner end of the cap, the cylindrical bore of said groove being spaced from the cylindrical periphery of the flinger-flange, and the radial wall of the groove being spaced from the outer side of the flinger flange, the inner periphery of said cap being a cylindrical bore having a close clearance from the outer periphery of the flinger-sleeve, said cap having one or more relatively wide grooves terminating in its inner periphery, and a drain-pipe secured to the lower side of said cap in draining communication to said relatively wide groove or grooves.

2. The invention as defined in claim 1, in combination with lubricant-loss-inhibiting means disposed between the bearing-housing and the flinger-flange.

3. The invention as defined in claim 1, characterized by said bearing-housing being grease-lubricated, and said bracket-hub having an inwardly projecting hub-flange having a cylindrical bore spaced from the cylindrical periphery of said flinger-sleeve, the outer side of said hub-flange and the inner side of said flinger-flange being spaced to provide a normally at least partially filled grease-pocket.

EPHRAIM H. ANDERSON.

REFERENCES CITED

The following references are of record in the file of this patent:

UNITED STATES PATENTS

| Number | Name | Date |
|---|---|---|
| 1,919,248 | Murphy | July 25, 1933 |
| 2,003,000 | Kelpe | May 28, 1935 |
| 2,135,230 | Sanders | Oct. 11, 1938 |